United States Patent
Wang (10) Patent No.: US 10,430,951 B2
(45) Date of Patent: Oct. 1, 2019

(54) METHOD AND DEVICE FOR STRAIGHT LINE DETECTION AND IMAGE PROCESSING

(71) Applicant: SHENZHEN A&E INTELLIGENT TECHNOLOGY INSTITUTE CO., LTD., Shenzhen, Guangdong (CN)

(72) Inventor: Li Wang, Guangdong (CN)

(73) Assignee: BEIJING A&E TECHNOLOGIES CO., LTD., Beijing (CN)

(*) Notice: Subject to any disclaimer, the term of this patent is extended or adjusted under 35 U.S.C. 154(b) by 173 days.

(21) Appl. No.: 15/552,468

(22) PCT Filed: Nov. 13, 2015

(86) PCT No.: PCT/CN2015/094548
§ 371 (c)(1),
(2) Date: Aug. 21, 2017

(87) PCT Pub. No.: WO2016/055031
PCT Pub. Date: Apr. 14, 2016

(65) Prior Publication Data
US 2018/0122083 A1 May 3, 2018

(30) Foreign Application Priority Data
Oct. 9, 2014 (CN) .......................... 2014 1 0528699

(51) Int. Cl.
*G06T 7/10* (2017.01)
*G06T 7/168* (2017.01)
(Continued)

(52) U.S. Cl.
CPC ............... *G06T 7/168* (2017.01); *G06K 9/00* (2013.01); *G06T 7/12* (2017.01); *G06T 7/13* (2017.01);
(Continued)

(58) Field of Classification Search
CPC .. G06T 7/168; G06T 7/12; G06T 7/13; G06T 7/73; G06T 2207/20061; G06K 9/00
See application file for complete search history.

(56) References Cited

U.S. PATENT DOCUMENTS 6,408,105 B1 * 6/2002 Maruo .................... G06T 7/001
382/190
7,200,282 B2    4/2007 Xu
(Continued)

FOREIGN PATENT DOCUMENTS

| CN | 102156884 A | | 8/2011 |
|----|-------------|---|--------|
| JP | H 10-208056 | * | 8/1998 |
| JP | 2004151815 A | | 5/2004 |

OTHER PUBLICATIONS

Machine translation for JP H 10-208056 (Year: 1998).*

*Primary Examiner* — Qian Yang
(74) *Attorney, Agent, or Firm* — Andrew C. Cheng (57) ABSTRACT

The present disclosure discloses a method and device for straight line detection and image processing. The straight line detection method includes: dividing a horizontal axis and a vertical axis of a straight line parameter space equally, so as to divide the straight line parameter space into a plurality of parameter areas; voting for the plurality of parameter areas utilizing a coordinate of each sample pixel to obtain a vote amount of each of the parameter areas; extracting a straight line parameter and the vote amount of each of the parameter areas having the vote amount larger than a voting threshold, and grouping the straight line parameters into a group; and weighting and averaging the straight line parameter of each group and the vote amount respectively to obtain the straight line parameter of a detected straight line. The present disclosure also discloses a robot and a numerical control machine.

7 Claims, 8 Drawing Sheets

(51) Int. Cl.
*G06T 7/73* (2017.01)
*G06T 7/13* (2017.01)
*G06K 9/00* (2006.01)
*G06T 7/12* (2017.01)

(52) U.S. Cl.
CPC ...... *G06T 7/73* (2017.01); *G06T 2207/20061* (2013.01)

(56) References Cited

U.S. PATENT DOCUMENTS

| | | | | |
|---|---|---|---|---|
| 2002/0027672 | A1* | 3/2002 | Horie | H04N 1/047 358/1.12 |
| 2003/0034992 | A1* | 2/2003 | Brown Elliott | G06T 3/4015 345/690 |
| 2014/0226167 | A1* | 8/2014 | Smith | G03B 21/14 356/614 |

* cited by examiner

METHOD AND DEVICE FOR STRAIGHT LINE DETECTION AND IMAGE PROCESSING

TECHNICAL FIELD

Embodiments of the present disclosure generally relate to communication technology, and in particular relate to a method and device for straight line detection and image processing.

BACKGROUND

Figure 1:
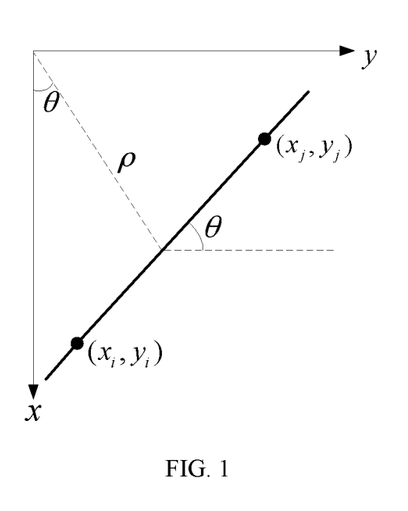
FIG. 1 is a coordinate diagram of a plane straight line of an xy original space in the prior art.
Figure 2:
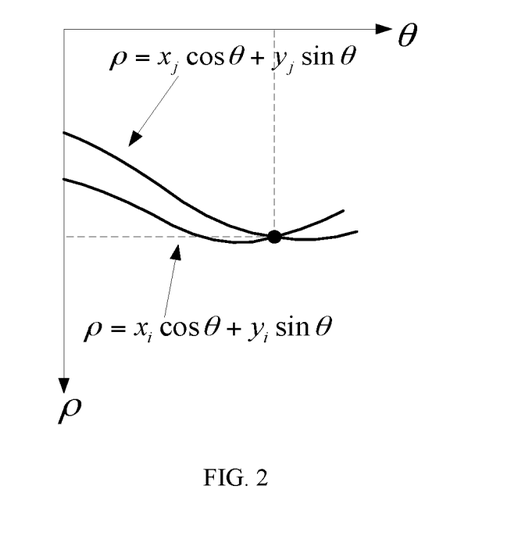
FIG. 2 is a coordinate diagram of a plane sinusoidal curve of a $\rho\theta$ parameter space in the prior art.
Figure 3:
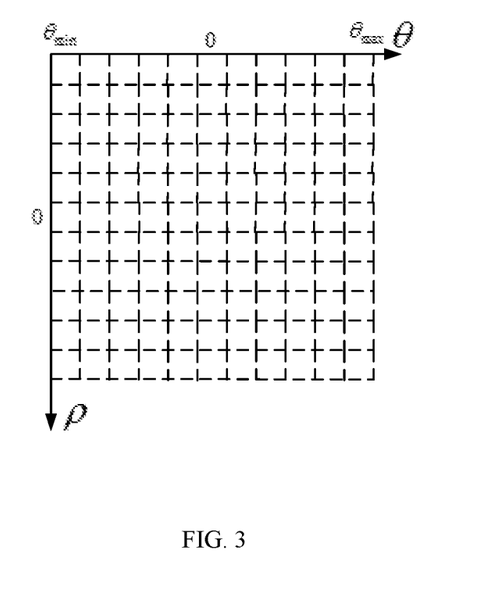
FIG. 3 is a voting area divided by the horizontal and vertical axes of a $\rho\theta$ parameter space in the prior art.

In real life, the plane outline of an object can generally be represented by a combination of straight lines or arcs. The Hough transformation is one of the basic methods for recognizing geometries from images. The basic idea of the Hough transformation is to convert the curve of an original space into a point of a parameter space through the curve expression by utilizing the duality of the point and the line, vote within the range of the independent variable in the parameter space through the foreground pixel, and set a threshold for the voting value. If a vote amount in a certain area is greater than the threshold, the area correspondingly has a straight line, and the voting peak is to be found in the area to determine the parameter in the curve expression, thereby determining the curve equation in the original space. As shown in FIG. 1, a straight line $\rho = x \cos \theta + y \sin \theta$ in a black and white image is determined, where $\rho$ denotes a distance from the origin of the image to the straight line, and $\theta$ denotes an angle between the straight line and the horizontal axis. In the original space field, as long as the parameters $\theta$ and $\rho$ are determined, the straight line in the range of the given independent variable x is determined. As shown in FIG. 2, if the range of a point $(x_i, y_i)$ and the parameter $\theta$ are determined, one $\rho$ is determined whenever one $\theta$ is given, which corresponds to a set of straight lines passing through the point $(x_i, y_i)$ in the original space; if two points $(x_i, y_i)$ and $(x_j, y_j)$ are given, the intersection point $(\theta', \rho')$ of two sinusoidal curves $\rho = x_i \cos \theta + y_i \sin \theta$ and $\rho = x_j \cos \theta + y_j \sin \theta$ are the straight line parameters passing through the two points. As shown in FIG. 3, when $\theta$ is taken from the minimum value $\theta_{min}$ to the maximum value $\theta_{max}$ successively, the corresponding $\rho$ in each area is accumulated. If each point on the straight line in the original space is voted in the corresponding parameter space, there must be a peak of the largest amount of accumulated votes in a plurality of regions in the parameter space, and the parameter corresponded by the peak is the corresponding parameter of the straight line to be found.

Figure 5:
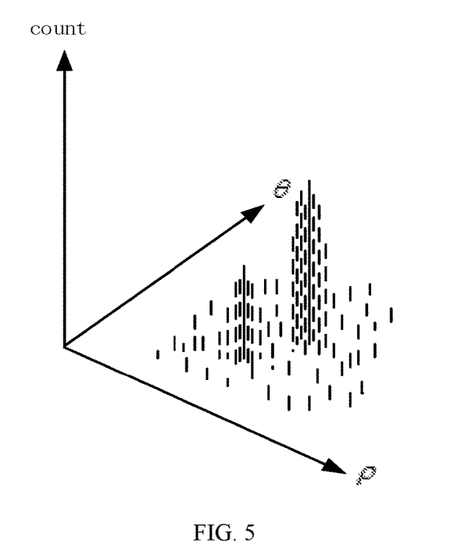
FIG. 5 is a statistic diagram of a vote amount in a $\rho\theta$ parameter space in the prior art.

In order to filter out the short straight lines which has fewer foreground pixels and fewer votes, it needs to lower the filter threshold, but lowering the filter thresholds will also lead to more straight lines near the long straight lines being filtered out. As shown in FIG. 5, the voting weight which is not much different from the voting peak is increased significantly. If all these votes are taken as the straight line parameters, there must be more straight lines to be extracted in the corresponding original space, and the effect of finding the ideal straight lines accurately cannot be achieved. Therefore, there are contradictions in the straight line detection accuracy and the coverage scope in the Hough transformation method in the prior art: if the voting filter threshold is large, the short straight lines will not be detected; if the voting filter threshold is small, the detection accuracy of the long straight lines will be lower.

SUMMARY

The technical problem that the present disclosure mainly solves is to provide a method and device for straight line detection and image processing, which can improve the calculation accuracy of straight line detection parameters and increase the acting scope of the Hough transform.

In order to solve the above technical problem, an aspect of the present disclosure provides a straight line detection method. The method includes: dividing a horizontal axis and a vertical axis of a straight line parameter space equally at a predetermined first pitch and a predetermined second pitch, respectively, so as to divide the straight line parameter space into a plurality of parameter areas; voting for the plurality of parameter areas of the straight line parameter space utilizing a coordinate of each sample pixel to obtain a vote amount of each of the parameter areas; extracting a straight line parameter and the vote amount of each of the parameter areas having the vote amount larger than a voting threshold, and grouping the straight line parameters having a distance within a range of a predetermined distance threshold in the straight line parameter space into a group; and weighted averaging the straight line parameter and the vote amount of each group respectively to obtain the straight line parameter of a detected straight line.

In order to solve the above technical problem, an aspect of the present disclosure provides an image processing method. The method includes: obtaining an image to be processed; performing an edge detection on the image to obtain a plurality of sample pixels; dividing a horizontal axis and a vertical axis of a straight line parameter space equally at a predetermined first pitch and a predetermined second pitch, respectively, so as to divide the straight line parameter space into a plurality of parameter areas; voting for the plurality of parameter areas of the straight line parameter space utilizing a coordinate of each sample pixel to obtain a vote amount of each of the parameter areas; extracting a straight line parameter and the vote amount of each of the parameter areas having the vote amount larger than a voting threshold, and grouping the straight line parameters having a distance within a range of a predetermined distance threshold in the straight line parameter space into a group; weighted averaging the straight line parameter and the vote amount of each group respectively to obtain the straight line parameter of a detected straight line; and outputting or storing a straight line parameter of the detected straight line.

In order to solve the above technical problem, an aspect of the present disclosure provides a straight line detection device. The device includes: an area dividing module, a voting module, an extraction module, and a processing module. The area dividing module is configured to divide a horizontal axis and a vertical axis of a straight line parameter space equally at a predetermined first pitch and a predetermined second pitch, so as to divide the straight line parameter space into a plurality of parameter areas; the voting module is configured to vote for the plurality of parameter areas of the straight line parameter space utilizing a coordinate of each sample pixel to obtain a vote amount of each of the parameter areas; the extraction module is configured to obtain a straight line parameter and the vote amount of each of the parameter areas having the vote amount larger than a voting threshold, and group the straight line parameters having a distance within a range of a predetermined distance threshold in the straight line parameter space into a group; and the processing module is configured to weight and average the straight line parameter and the vote amount of each group respectively to obtain the straight line parameter of a detected straight line.

In order to solve the above technical problem, an aspect of the present disclosure provides an image processing device. The device includes: an image obtaining module, an edge detection module, an area dividing module, a voting module, an extraction module, a processing module, and an output module. The image obtaining module is configured to obtain an image to be processed; the edge detection module is configured to perform an edge detection on the image to obtain a plurality of sample pixels; the area dividing module is configured to divide a horizontal axis and a vertical axis of a straight line parameter space equally at a predetermined first pitch and a predetermined second pitch, so as to divide the straight line parameter space into a plurality of parameter areas; the voting module is configured to vote for the plurality of parameter areas of the straight line parameter space utilizing a coordinate of each sample pixel to obtain a vote amount of each of the parameter areas; the extraction module is configured to obtain a straight line parameter and the vote amount of each of the parameter areas having the vote amount larger than a voting threshold, and group the straight line parameters having a distance within a range of a predetermined distance threshold in the straight line parameter space into a group; the processing module is configured to weight and average the straight line parameter and the vote amount of each group respectively to obtain the straight line parameter of a detected straight line; and the output module is configured to output or store a straight line parameter of the detected straight line.

In order to solve the above technical problem, an aspect of the present disclosure provides a robot. The robot includes: a robot body, a control device mounted inside the robot body, and an image capturing device mounted on the robot body, where the control device includes the above-mentioned image processing device, the image processing device is configured to process an image captured by the image capturing device, and the control device is configured to issue a control instruction to the robot according to a processing result of the image processing device.

In order to solve the above technical problem, an aspect of the present disclosure provides a numerical control machine. The machine includes: a machine body, an image capturing device mounted on the machine body, a numerical control system, a servo drive device, a motor connected to the servo drive device, a processing device connected to the motor, the numerical control device being electrically connected to the servo drive device and the image capturing device, the numerical control device including the above-mentioned image processing device, the image processing device being configured to process an image captured by the image capturing device, the numerical control device being configured to issue a control instruction to the servo drive device according to a processing result of the image processing device.

The present disclosure has the advantages which, in contrast to the prior art, after voting for the plurality of parameter areas of the straight line parameter space, the present disclosure groups the straight line parameters into groups, calculates the straight line parameter of each group by using a weighted average method of the vote amount. In this manner, the voting threshold can be set relatively small, so that more short lines can be detected, and the obtained straight line parameters are more accurate.

DETAILED DESCRIPTION

Figure 6:
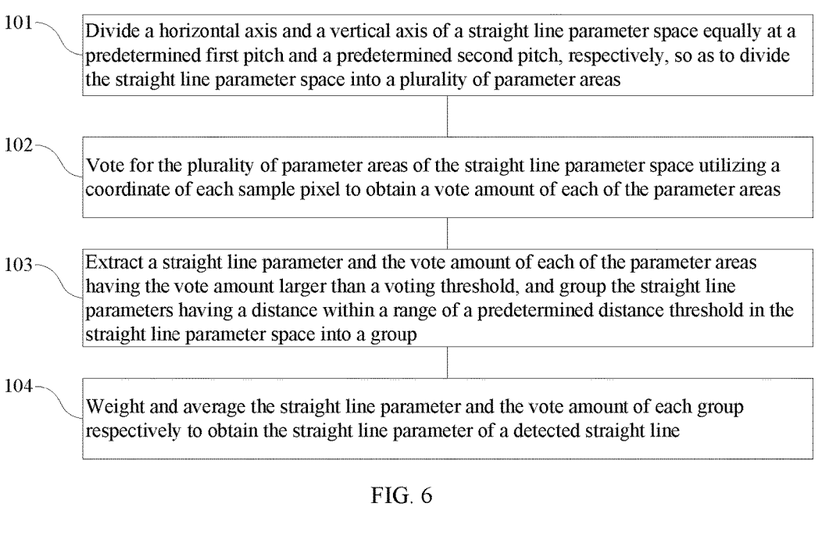
FIG. 6 is a flow chart of a straight line detection method according to an embodiment of the present disclosure.

Referring to FIG. 6, a flow chart of a straight line detection method according to an embodiment of the present disclosure is depicted. The method may include the following blocks.

At 101: dividing a horizontal axis and a vertical axis of a straight line parameter space equally at a predetermined first pitch and a predetermined second pitch, respectively, so as to divide the straight line parameter space into a plurality of parameter areas.

The straight line in the present disclosure is preferably represented by a polar coordinate parameter equation $\rho = x \cos\theta + y \sin\theta$, where x denotes the horizontal coordinate of the straight line, y denotes the vertical coordinate of the straight line, the parameter $\rho$ is a distance from the straight line to the origin, and the parameter $\theta$ is an angle between the straight line and the horizontal axis. Of course, the straight lines can also be expressed in other forms such as point-slope form and two-point form, which is not limited here.

When a sample pixel $(x_i, y_i)$ of an xy original image space is taken, the independent variable $\theta$ of the parameter space is taken from the minimum value $\theta_{min}$ to the maximum value successively. One $\rho_i$ can be obtained in a corresponding area according to a straight line parameter equation $\rho = x_i \cos\theta_i + y_i \sin\theta_i$ whenever one $\theta_i$ is taken, and then realize the vote in a certain area according to $\theta_i$ and $\rho_i$ fall in the certain area. Before achieving that goal, the horizontal axis and the vertical axis of the straight line parameter space is divided equally at the predetermined first pitch and the predetermined second pitch, respectively, such that the straight line parameter space is divided into a plurality of parameter areas.

Figure 4:
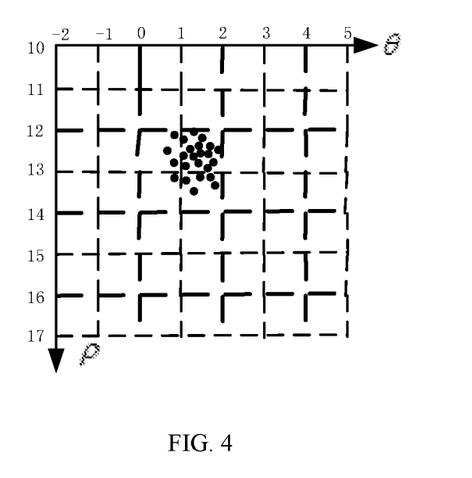
FIG. 4 is a schematic diagram of a voting in a $\rho\theta$ parameter space in the prior art.

As shown in FIG. 4, since the pixels of an image are discrete values, the points on a straight line in the image are distributed around the ideal straight line in a discrete manner, and the voting for the corresponding parameter area is also distributed in a discrete manner. If the division of areas is too large, for example, when $\theta$ and $\rho$ are divided in the unit of 2, the voting peak in a range of $\rho \in (12,14)$ and $\theta \in (0,2)$, a straight line of $\rho=13$, $\theta=1$ is obtained and has a vote amount of 24, although the vote amount is more aggregated, the obtained parameter may not be accurate since the areas are larger; if the division of areas is too small, although the parameters are more accurate, the vote amount may be scattered and the difference between the voting peak and the amount of the around votes is not obvious, hence it is likely to be eliminated in the late filters.

Figure 7:
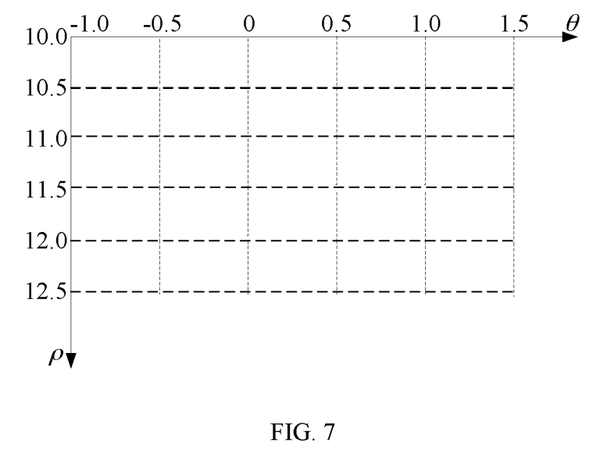
FIG. 7 is a voting area divided by the horizontal and vertical axes of a $\rho\theta$ parameter space according to an embodiment of the present disclosure.

Preferably, in order to make the expression of the parameter of the coordinate axis more accurate, the first pitch and the second pitch are both fractions smaller than 1. Specifically, as shown in FIG. 7, in this embodiment, the horizontal axis coordinate and the vertical axis coordinate are divided at a fractional distance of 0.5. It is to be noted that 0.5 is merely an example here, and other decimals such as 0.2 and 0.1 or other more accurate decimals such as two digits decimals and three digits decimals can also be used.

At 102: voting for the plurality of parameter areas of the straight line parameter space utilizing a coordinate of each sample pixel to obtain a vote amount of each of the parameter areas.

In the parameter space, it can be seen from the straight line parameter equation $\rho=x \cos \theta + y \sin \theta$ that the voting for each of the areas of the straight line parameter space is completed after $\theta$ is taken from the minimum value $\theta_{min}$ to the maximum value $\theta_{max}$ successively. The vote amount $m_i$ of each of the areas is obtained by accumulating the corresponding vote amount of each of the areas.

Figure 8:
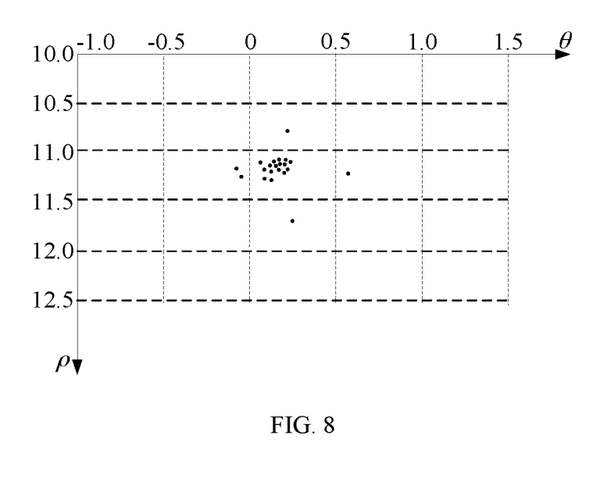
FIG. 8 is a schematic diagram of a voting in a $\rho\theta$ parameter space according to an embodiment of the present disclosure.

As shown in FIG. 8, within the range of $\rho \in (11.0,11.5)$ and $\theta \in (-0.5, 0)$, the vote amount is 2; within the range of $\rho \in (11.0,11.5)$ and $\theta \in (0.5,0)$, the vote amount is 16; and within the range of $\rho \in (11.0,11.5)$ and $\theta \in (0.5,1.0)$, $\rho \in (10.5, 11.0)$ and $\theta \in (0,0.5)$, as well as $\rho \in (11.5,12.0)$ and $\theta \in (0,0.5)$, the vote amounts are respectively 1. In other embodiments, if the straight line is represented by other parameter equations, the voting here can also be performed.

At 103: extracting a straight line parameter and the vote amount of each of the parameter areas having the vote amount larger than a voting threshold, and grouping the straight line parameter(s) having a distance within a range of a predetermined distance threshold in the straight line parameter space into a group.

Figure 9:
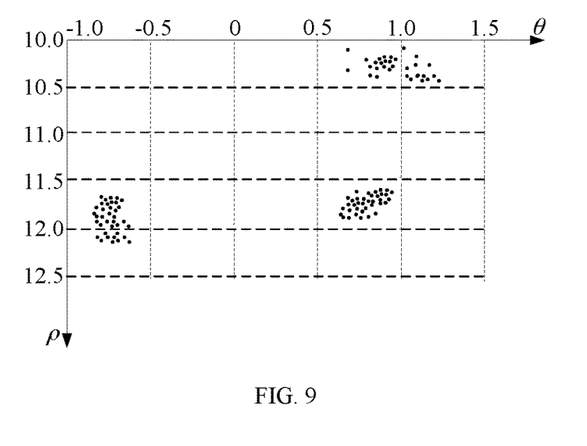
FIG. 9 is a schematic diagram of a voting in a $\rho\theta$ parameter space according to another embodiment of the present disclosure.

In the original image, the outline of an object is usually composed of multiple curves, and there may be more than one straight line. Multiple straight lines will have an amount of the corresponding straight line parameters which equal to the amount of the straight line, which has an amount of the concentrated area of the voting equal to the amount of the straight lines in $\rho\theta$ parameter space. In order to find out each of the straight lines, the voting for these areas has to be grouped first. As shown in FIG. 9, it can be seen that the vote amount is concentrated in three areas, $\rho \in (11.5,12.5)$ and $\theta \in (-1.0,-0.5)$, $\rho \in (10.0,10.5)$ and $\theta \in (0.5,1.5)$, as well as $\rho \in (11.5,12.0)$ and $\theta \in (0.5,1.0)$. In order to distinguish these three areas, a distance threshold of the straight line parameters $\rho$ and $\theta$ are set separately, and the straight line parameters in a same threshold range are grouped into one group. As shown in FIG. 9, in this embodiment, the threshold range of the parameters $\rho$ and $\theta$ are set respectively by taking the concentrated area of the vote amount as the center and taking 1 and 1° as the distance threshold. As a result, the above-mentioned areas $\rho \in (11.5,12.5)$ and $\theta \in (-1.0,-0.5)$, $\rho \in (10.0,10.5)$ and $\theta \in (0.5,1.5)$, as well as $\rho \in (11.5,12.0)$ and $\theta \in (0.5,1.0)$ are grouped into three groups.

At 104: weighted averaging the straight line parameter and the vote amount of each group respectively to obtain the straight line parameter of a detected straight line.

Since the sample pixels in the original image space are discrete, the scatter of these pixels leads to the scatter of the vote amount, and these scattered voting points actually correspond to a same straight line in the original space. It is not that all the coordinates of the sample pixels are accurate because the objective error exists while sampling the pixels. In order to remove these inaccurate pixels, the voting threshold is set, and the straight line parameter and the vote amount of each of the parameter areas having the vote amount larger than a voting threshold is extracted after the voting and the groping of all the sample pixels within the range of the independent variable of the parameter space is completed, which not only improves the accuracy of the coordinates of the sample pixels and the vote amounts, but also reduces the workload of the subsequent calculation.

It should be noted that the specific values of the above-mentioned voting thresholds can be set by those skilled in the art in accordance with the experience value or the accuracy of detection, and the specific values thereof are not limited thereto.

In the parameter space, the area with the largest vote amount in each group is defined as the central area. The larger the vote amount in the area closer to the central area, the more accurate the straight line parameter closer to the center, and the parameters are calculated using the weighted average of the vote amount. The method averages different weights to get an average. The larger the vote amount, the corresponding parameters of the area closer to the true value, and the greater the occupied weight in the weighted average calculation, while the area with the smaller vote amount correspondingly occupies the smaller weight.

The following is a description of the weighted average calculation of the straight line parameters of one of the groups (for convenience of reference, named as the first group): specifically, calculating a voting weight $P_i$ corresponded by the straight line parameters $\theta_i$ and $\rho_i$ according to the vote amount $m_i$, and the formula may be $P_i = m_i - m_{min} / m_{max} - m_{min}$, where $m_i$ is the vote amount corresponded by any of the straight line parameters $\theta_i$ and $\rho_i$ in the first group, $m_{min}$ is the minimum vote amount corresponded by the straight line parameter in the first group (i.e., the minimum value in $m_i$), $m_{max}$ is the maximum vote amount corresponded by the straight line parameter in the first group (i.e., the maximum value in $m_i$), and the minimum vote amount $m_{min}$ is greater than the set voting threshold.

It should be noted that subtracting the minimum vote amount $m_{min}$ in the calculation can increase the difference between the vote amounts, so that the occupied weight of each area is more obvious, for example, if the minimum vote amount $m_{min}$ is 101 and the maximum vote amount $m_{max}$ is 109, the vote amounts of other areas are between 102 and 108, which does not have an obvious difference. Suppose that the vote amount of a certain area is 103, the difference between 103 and 109 is not too great. However, after being subtracted by the minimum number $m_{min}$ 100 simultaneously, the ratio of 3 to 9 is greater than that of 103 to 109, hence the accuracy of the voting weight $P_i$ can be significantly improved by using this method.

After the voting weight $P_i$ is obtained, the straight line parameters θ and ρ are calculated based on the voting weight $P_i$. Since each set of the parameters corresponds to one straight line, multiple straight lines can be found correspondingly in the xy original space when multiple sets of the parameters are obtained. The weighted average formula of the straight line parameters is:

$$\begin{cases} \theta = \theta_i & i = n = 1 \\ \theta = \dfrac{\sum_{i=1}^{n} \theta_i P_i}{\sum_{i=1}^{n} P_i} & i = 1, \ldots, n \ n > 1 \end{cases} \begin{cases} \rho = \rho_i & i = n = 1 \\ \rho = \dfrac{\sum_{i=1}^{n} \rho_i P_i}{\sum_{i=1}^{n} P_i} & i = 1, \ldots, n \ n > 1 \end{cases};$$

where $\theta_i$ is an angle between the i-th straight line in the first group and the horizontal axis, and $\rho_i$ is a distance from the origin to the i-th straight line in the first group, that is, $\theta_i$ and $\rho_i$ are the parameter of the parameter space corresponded by the i-th straight line in the first group, and $P_i$ is the voting weight of the parameter of the parameter space corresponded by the i-th straight line. It can be seen from the formula that when the votes of all the sample pixel is in a same area, that is, the only set of parameters $\theta_i$ and $\rho_i$ in the first group is obtained, a certain area in the corresponding xy original space has only one straight line. At this time, $\theta_i$ and $\rho_i$ are θ and ρ which are needed to be detected of the first group of straight lines, where the straight line corresponded by θ and ρ is the straight line to be detected in the area. However, this is not the case in general, the extracted parameters and the vote amount are very large, and the parameters $\theta_i$ and $\rho_i$ in the first group are calculated using weighted average formulas $$\theta = \dfrac{\sum_{i=1}^{n} \theta_i P_i}{\sum_{i=1}^{n} P_i} \ i = 1, \ldots, n \ n > 1 \text{ and } \rho = \dfrac{\sum_{i=1}^{n} \rho_i P_i}{\sum_{i=1}^{n} P_i} \ i = 1, \ldots, n \ n > 1.$$

Through using this method, it is possible to synthesize the information of the straight line parameters within a certain range, and then make the obtained straight line parameters more accurate.

In contrast to the prior art, this embodiment votes for the plurality of parameter areas of the straight line parameter space, extracts the straight line parameters and the vote amount having the voting amount larger than the voting threshold, groups the straight line parameters, and performs the weighted average processing on the extracted result, which effectively increases the difference between the voting peak and the amount of the around votes, thereby avoiding the valid vote amounts to be eliminated in the late filters. In addition, the weighted average is performed on the detected large number of valid parameters, that is, a large number of discrete straight line groups corresponding to the neighborhood of the long straight lines in the original image space, which can find the parameter center corresponded by the straight line parameter accurately, so that the results more accurate.

Figure 10:
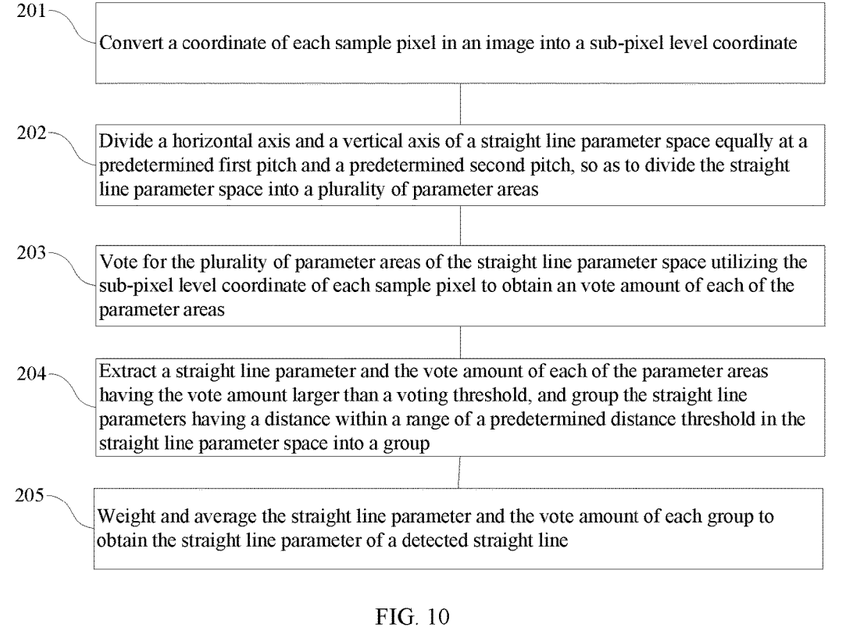
FIG. 10 is a flow chart of a straight line detection method according to another embodiment of the present disclosure.

Referring to FIG. 10, a flow chart of a straight line detection method according to another embodiment of the present disclosure is depicted. The method may include the following blocks.

At 201: converting a coordinate of each sample pixel in an image into a sub-pixel level coordinate.

When a camera photographs, the imaging surface is usually with pixel as the smallest unit, that is, the continuous image of the physical world is discretized. Which can be seen as connected together in a macro perspective, while there are infinitely smaller sub-pixels between them in a micro perspective. Thus, the conversion of the coordinate of the sample pixel to the sub-pixel level coordinate can improve the accuracy of the coordinate of the original space where the image exists and reduce the error with the points on the actual straight line. Preferably, the coordinate (x,y) of the sample pixel is converted to a pixel center coordinate (x+0.5,y+0.5). For example, if the coordinate of the sample pixel is (1, 2), the x-coordinate is within the range of interval [0,1] or [1,2], and the y-coordinate is within the range of interval [1,2] or [2,3], and because its pixels are expressed in integers, the basic error is 1 regardless of the x-coordinate or the y-coordinate; if converted to the pixel center coordinate (1.5, 2.5), the x-coordinate is within the range of interval [1,1.5] or [1.5,2], and the y-coordinate is within the range of interval [2,2.5] or [2.5,3], at this point the basic error becomes to 0.5, which obviously improves the coordinate accuracy of the sample pixel.

At 202: dividing a horizontal axis and a vertical axis of a straight line parameter space equally at a predetermined first pitch and a predetermined second pitch, so as to divide the straight line parameter space into a plurality of parameter areas.

Where the first pitch and the second pitch may each be a fraction smaller than 1. For details, refer to block 101, which will not be described here.

At 203: voting for the plurality of parameter areas of the straight line parameter space utilizing the sub-pixel level coordinate of each sample pixel to obtain an vote amount of each of the parameter areas.

When a sample pixel $(x_i, y_i)$ of an xy original image space is taken, one $\rho_i$ can be obtained in a corresponding area according to a straight line parameter equation $\rho = x_i \cos \theta_i + y_i \sin \theta_i$ whenever one $\theta_i$ is taken, and then realize the vote in a certain area according to $\theta_i$ and $\rho_i$ fall in the certain area. When the voting is completed, the voting parameters in each area are accumulated to obtain the vote amount of each area.

At 204: extracting a straight line parameter and the vote amount of each of the parameter areas having the vote amount larger than a voting threshold, and grouping the straight line parameters having a distance within a range of a predetermined distance threshold in the straight line parameter space into a group.

Since in the original image, the outline of an object may be more than one straight line, there will have an amount of the concentrated area of the voting equal to the amount of the straight line(s) in ρθ parameter space. At this point, each straight line has to be found out, and the voting for these areas has to be grouped first.

At 205: weighted averaging the straight line parameter and the vote amount of each group to obtain the straight line parameter θ and ρ of a detected straight line.

The following is a description of the weighted average calculation of the straight line parameters of one of the groups (for convenience of reference, named as the first group): specifically, calculating a voting weight $P_i$ corresponded by the straight line parameters $\theta_i$ and $\rho_i$ according to the vote amount and the formula may be $$P_i = \frac{m_i - m_{min}}{m_{max} - m_{min}},$$

where $m_i$ is the vote amount corresponded by any of the straight line parameters $\theta_i$ and $\rho_i$ in the first group, $m_{min}$ is the minimum vote amount corresponded by the straight line parameter in the first group (i.e., the minimum value in $m_i$), $m_{max}$ is the maximum vote amount corresponded by the straight line parameter in the first group (i.e., the maximum value in $m_i$), and the minimum vote amount $m_{min}$ is greater than the set voting threshold.

After the voting weight $P_i$ is obtained, the straight line parameters $\theta$ and $\rho$ are calculated based on the voting weight $P_i$. Since each set of the parameters in the $\rho\theta$ parameter pace corresponds to one straight line in the xy original space, multiple straight lines can be found correspondingly in the xy original space when multiple sets of the parameters are obtained, and the weighted average formula of the straight line parameters is:

$$\begin{cases} \theta = \theta_i & i = n = 1 \\ \theta = \dfrac{\sum_{i=1}^{n} \theta_i P_i}{\sum_{i=1}^{n} P_i} & i = 1, \ldots, n \;\; n > 1 \end{cases} \begin{cases} \rho = \rho_i & i = n = 1 \\ \rho = \dfrac{\sum_{i=1}^{n} \rho_i P_i}{\sum_{i=1}^{n} P_i} & i = 1, \ldots, n \;\; n > 1 \end{cases};$$

where $\theta_i$ is an angle between the i-th straight line and the horizontal axis in the image, and $\rho_i$ is a distance from the origin to the i-th straight line in the first group, that is, $\theta_i$ and $\rho_i$ are the parameter of the parameter space corresponded by the i-th straight line in the first group, and $P_i$ is the voting weight of the parameter of the parameter space corresponded by the i-th straight line. It can be seen from the formula that when the votes of all the sample pixel is in a same area, that is, the only set of parameters $\theta_i$ and $\rho_i$ in the first group is obtained, a certain area in the corresponding xy original space has only one straight line. When the extracted parameters and the vote amount are very large, and the parameters $\theta_i$ and $\rho_i$ in the first group are calculated using weighted average formulas $$\theta = \frac{\sum_{i=1}^{n} \theta_i P_i}{\sum_{i=1}^{n} P_i} \; i = 1, \ldots, n \; n > 1 \text{ and } \rho = \frac{\sum_{i=1}^{n} \rho_i P_i}{\sum_{i=1}^{n} P_i} \; i = 1, \ldots, n \; n > 1.$$

Through using this method, it is possible to synthesize the information of the straight line parameters within a certain range, and then make the obtained straight line parameters more accurate.

In contrast to the previous embodiment, this embodiment performs a sub-pixel level conversion to the coordinate of the sample pixel of the original image space, which reduces the error of the sample pixel, and sets the minimum pitch of the horizontal axis and the vertical axis of the straight parameter space to a decimal smaller than 1. As a result, the accuracy of the calculation is maintained at the decimal level, the obtained straight line parameters are sub-pixel level in the original image space, which further improves the accuracy of the straight line parameters.

Figure 11:
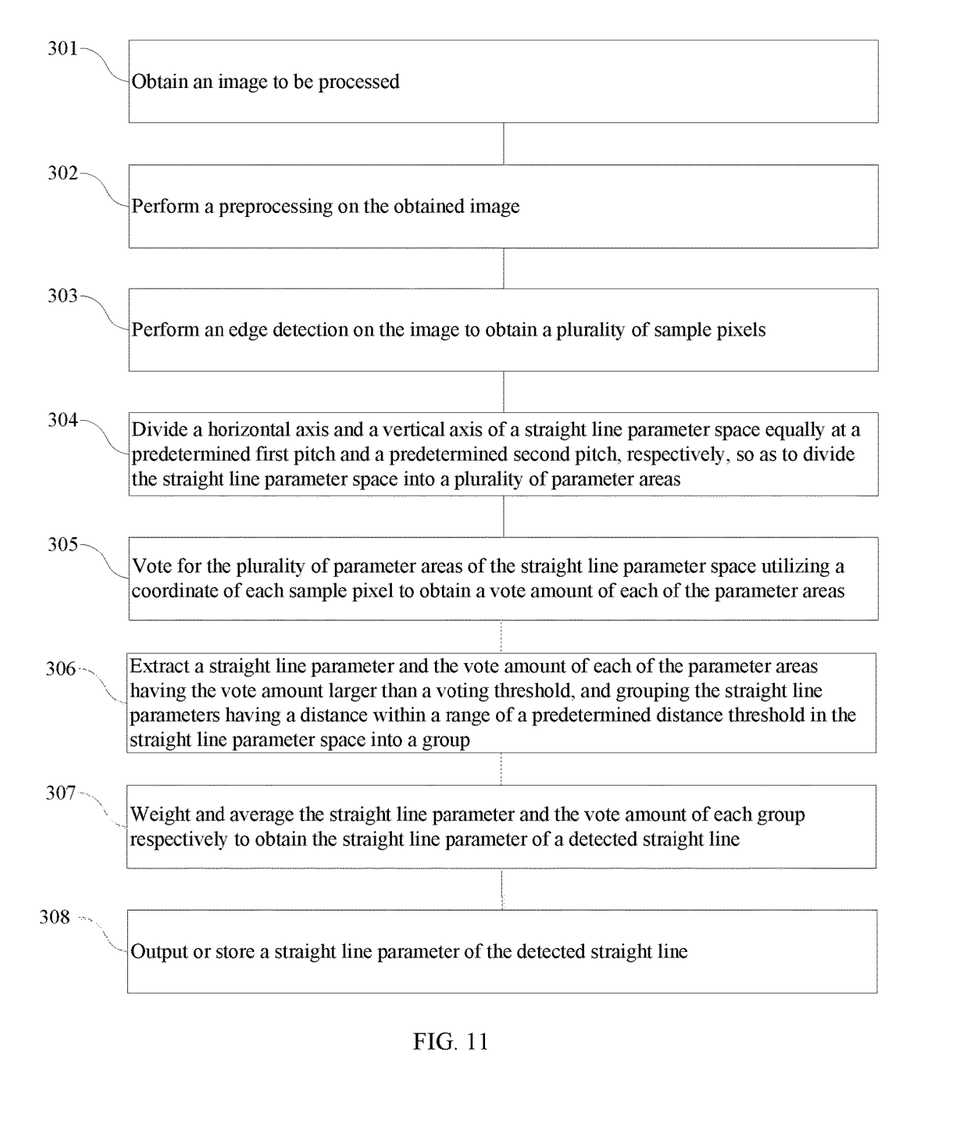
FIG. 11 is a flow chart of an image processing method according to another embodiment of the present disclosure.

Referring to FIG. 11, a flow chart of an image processing method according to another embodiment of the present disclosure is depicted. The method may include the following blocks.

At 301: obtaining an image to be processed.

At 302: performing a preprocessing on the obtained image.

For example, the above-mentioned preprocessing may include: a smoothing, an expanding, a looking for a maximum communicating area, and a corroding performed on the image. The above series of preprocesses to the image makes the original image data as simple as possible, which eliminates the part irrelevant to the straight line detection while keeping the shape characteristics in the image. In order to make the image clearer, the image is smoothed so as to filter, thereby eliminating various noises in the image. After filtering, in order to merge the background point in contact with the straight line into the straight line, the expanding processing is performed on the image. And then in order to eliminate the boundary points so that the border shrinks to the inside, the corroding processing is performed on the image. After the image is smoothed, expanded and corroded, all the connected components are found after all pixels are scanned, and then the amount of the pixels of each connected component is compared to find the maximum connected component. In this embodiment, since the detection of the connected component is performed after expanding the image, the connected area extracted from the original image will be larger than the actual area, and the loss of information can be effectively prevented. Step 302 is an optional step.

At 303: performing an edge detection on the image to obtain a plurality of sample pixels.

After the image processing, the edge of the image is detected. Under normal circumstances, the edge points of the image refer to those pixels in the image which the surrounding pixels have a step change in the gray scale. The edge detection can greatly reduce the amount of data and remove irrelevant information while retain the pixels in the image which can represent the image attribute structure. There are many methods for edge detection, which is not limited here.

The following is the methods for processing the sample pixel and obtaining the parameters, which has the working principle and the specific embodiments have been described in detail in the first two embodiments and FIGS. 6-10, and are not described here.

At 304: dividing a horizontal axis and a vertical axis of a straight line parameter space equally at a predetermined first pitch and a predetermined second pitch, respectively, so as to divide the straight line parameter space into a plurality of parameter areas.

At 305: voting for the plurality of parameter areas of the straight line parameter space utilizing a coordinate of each sample pixel to obtain a vote amount of each of the parameter areas At 306: extracting a straight line parameter and the vote amount of each of the parameter areas having the vote amount larger than a voting threshold, and grouping the straight line parameters having a distance within a range of a predetermined distance threshold in the straight line parameter space into a group.

At 307: weighted averaging the straight line parameter and the vote amount of each group respectively to obtain the straight line parameter of a detected straight line.

It should be noted that if the straight line parameters are grouped into multiple groups, each group obtains one straight parameter of a corresponding straight line.

At 308: outputting or storing a straight line parameter of the detected straight line.

In another embodiment, before the dividing the horizontal axis and the vertical axis of the straight line parameter space equally at the predetermined first pitch and the predetermined second pitch, respectively, so as to divide the straight line parameter space into a plurality of parameter areas, further includes converting a coordinate of each sample pixel in an image into a sub-pixel level coordinate. The conversion of the coordinate of the sample pixel to the sub-pixel level coordinate can improve the accuracy of the coordinate of the original space where the image exists and reduce the error with the points on the actual straight line. Preferably, the coordinate (x,y) of the sample pixel are converted to a pixel center coordinate (x+0.5,y+0.5), which improves the coordinate accuracy of the sample pixel.

In contrast to the prior art, this embodiment detects the straight line in the image, and after the image is processed and the edge is detected, it votes for the plurality of parameter areas of the straight line parameter space, extracts the straight line parameters and the vote amount having the voting amount larger than the voting threshold, groups the straight line parameters, and performs the weighted average processing on the extracted result, which effectively increases the difference between the voting peak and the amount of the around votes, thereby avoiding the valid vote amounts to be eliminated in the late filters. In addition, the weighted average is performed on the detected large number of valid parameters, that is, a large number of discrete straight line groups corresponding to the neighborhood of the long straight line in the original image space, which can find the parameter center corresponded by the straight line parameter accurately, so that the results more accurate.

Figure 12:
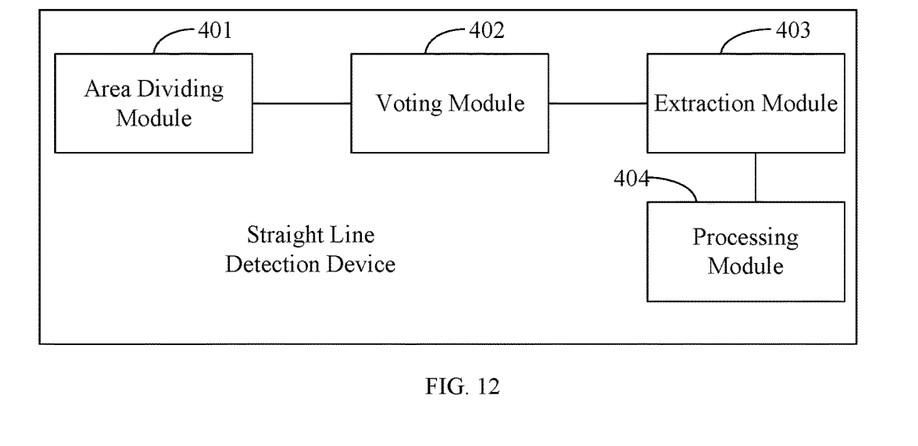
FIG. 12 is a schematic diagram of a straight line detection device according to an embodiment of the present disclosure.

Referring to FIG. 12, a schematic diagram of a straight line detection device according to an embodiment of the present disclosure is depicted. The straight line detection method shown in FIG. 6 is applied to the straight line detection device of this embodiment. The device of this embodiment includes an area dividing module 401, a voting module 402, an extraction module 403, and a processing module 404.

The area dividing module 401 is configured to divide a horizontal axis and a vertical axis of a straight line parameter space equally at a predetermined first pitch and a predetermined second pitch, so as to divide the straight line parameter space into a plurality of parameter areas.

The straight line in the present disclosure is preferably represented by a polar coordinate parameter equation $\rho = x \cos\theta + y \sin\theta$, where x denotes the horizontal coordinate of the straight line, y denotes the vertical coordinate of the straight line, the parameter $\rho$ is a distance from the straight line to the origin, and the parameter $\theta$ is an angle between the straight line and the horizontal axis. Of course, the straight lines can also be expressed in other forms, for example, point-slope form, two-point form, etc., which is not limited here.

In one embodiment, the first pitch and the second pitch are both fractions smaller than 1.

The voting module 402 is configured to vote for the plurality of parameter areas of the straight line parameter space utilizing a coordinate of the straight line of each sample pixel to obtain a vote amount of each of the parameter area.

The extraction module 403 is configured to extract a straight line parameter and the vote amount of each of the parameter areas having the vote amount larger than a voting threshold, and group the straight line parameters having a distance within a range of a predetermined distance threshold in the straight line parameter space into a group. The processing module 404 is configured to weight and average the straight line parameter and the vote amount of each group respectively to obtain the straight line parameter of a detected straight line.

The following is a description of the weighted average calculation of the straight line parameters of one of the groups (for convenience of reference, named as the first group): specifically, calculating a voting weight $P_i$ corresponded by the straight line parameters $\theta_i$ and $\rho_i$ according to the vote amount $m_i$, and the formula may be $$P_i = \frac{m_i - m_{min}}{m_{max} - m_{min}},$$

where $m_i$ is the vote amount corresponded by any of the straight line parameters $\theta_i$ and $\rho_i$ in the first group, $m_{min}$ is the minimum vote amount corresponded by the straight line parameter in the first group (i.e., the minimum value in $m_i$), $m_{max}$ is the maximum vote amount corresponded by the straight line parameter in the first group (i.e., the maximum value in $m_i$), and the minimum vote amount $m_{min}$ is greater than the set voting threshold.

After the voting weight $P_i$ is obtained, the straight line parameters $\theta$ and $\rho$ are calculated based on the voting weight $P_i$. Since each set of the parameters in the $\rho\theta$ parameter pace corresponds to one straight line in the xy original space, when multiple sets of the parameters are obtained, the weighted average formula of the straight line parameters is:

$$\begin{cases} \theta = \theta_i & i = n = 1 \\ \theta = \dfrac{\sum_{i=1}^{n} \theta_i P_i}{\sum_{i=1}^{n} P_i} & i = 1, \ldots, n \quad n > 1 \end{cases} \quad \begin{cases} \rho = \rho_i & i = n = 1 \\ \rho = \dfrac{\sum_{i=1}^{n} \rho_i P_i}{\sum_{i=1}^{n} P_i} & i = 1, \ldots, n \quad n > 1 \end{cases};$$

where $\theta_i$ is an angle between the i-th straight line and the horizontal axis in the first group, and $\rho_i$ is a distance from the origin to the i-th straight line in the first group, that is, $\theta_i$ and $\rho_i$ are the parameter of the parameter space corresponded by the i-th straight line in the first group, and $\rho_i$ is the voting weight of the parameter of the parameter space corresponded by the i-th straight line. It can be seen from the formula that when the votes of all the sample pixel is in a same area, that is, the only set of parameters $\theta_i$ and $\rho_i$ in the first group is obtained, a certain area in the corresponding xy original space has only one straight line. At this time, $\theta_i$ and $\rho_i$ are $\theta$ and $\rho$ needed to be detected of the first group of straight lines, where the straight line corresponded by $\theta$ and $\rho$ is the straight line needed to be detected of the area. However, this is not the case in general, the obtained parameters and the vote amount are very large, and the parameters $\theta_i$ and $\rho_i$ in the first group are calculated using weighted average formulas $$\theta = \frac{\sum_{i=1}^{n} \theta_i P_i}{\sum_{i=1}^{n} P_i} \; i=1,\ldots,n \; n>1 \text{ and } \rho = \frac{\sum_{i=1}^{n} \rho_i P_i}{\sum_{i=1}^{n} P_i} \; i=1,\ldots,n \; n>1.$$

Through using this method, it is possible to synthesize the information of the straight line parameters within a certain range, and then make the obtained straight line parameters more accurate.

Figure 13:
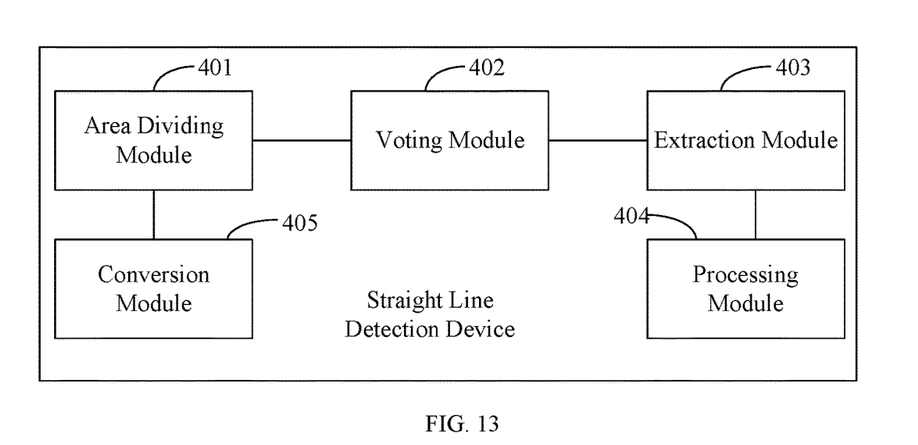
FIG. 13 is a schematic diagram of a straight line detection device according to another embodiment of the present disclosure.

Referring to FIG. 13, a schematic diagram of a straight line detection device according to another embodiment of the present disclosure is depicted. This embodiment differs from the previous embodiment in that the straight line detection device of this embodiment further includes a conversion module 405.

The conversion module 405 is configured to convert the coordinate of each sample pixel in an image into a sub-pixel level coordinate. Preferably, the coordinate (x,y) of the sample pixel are converted to a pixel center coordinate (x+0.5,y+0.5). For example, when the coordinate of the sample pixel is (1, 2), the x-coordinate is within the range of interval [0,1] or [1,2], and the y-coordinate is within the range of interval [1,2] or [2,3], and because its pixels are expressed in integers, the basic error is 1 regardless of the x-coordinate or the y-coordinate; when converted to the pixel center coordinate (1.5, 2.5), the x-coordinate is within the range of interval [1,1.5] or [1.5,2], and the y-coordinate is within the range of interval [2,2.5] or [2.5,3], at this point the basic error becomes to 0.5. The area dividing module 401 is utilized to convert the coordinate of the sample pixel to the sub-pixel level coordinate, which can improve the accuracy of the coordinate of the original space where the image exists and reduce the error with the points on the actual straight line.

In contrast to the previous embodiment, this embodiment utilizes the area dividing module 401 to convert the coordinate of the sample pixel to the sub-pixel level coordinate, which can improve the accuracy of the coordinate of the original space where the image exists and reduce the error with the points on the actual straight line.

Figure 14:
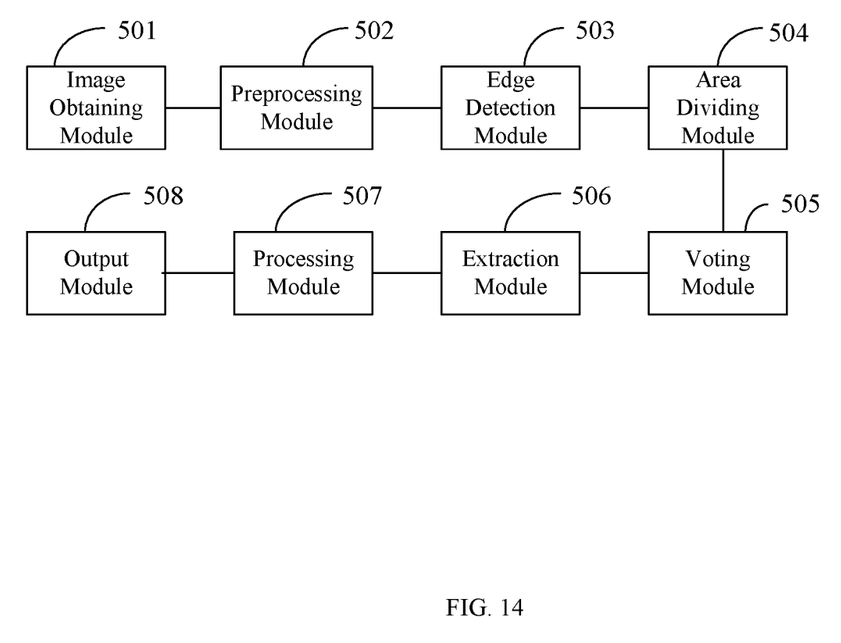
FIG. 14 is a schematic diagram of an image processing device according to an embodiment of the present disclosure.

Referring to FIG. 14, a schematic diagram of an image processing device according to an embodiment of the present disclosure is depicted. The image processing method shown in FIG. 11 is applied to the image processing device of this embodiment. The device of this embodiment includes an image obtaining module 501, a preprocessing module 502, an edge detection module 503, an area dividing module 504, a voting module 505, an extraction module 506, a processing module 507, and an output module 508.

The image obtaining module 501 is configured to obtain an image to be processed.

The preprocessing module 502 is configured to perform a preprocessing on the obtained image.

The above-mentioned preprocessing may include: a smoothing, an expanding, a looking for a maximum communicating area, and a corroding performed on the image. The preprocessing module 502 is an optional module.

The edge detection module 503 is configured to perform an edge detection on the image to obtain a plurality of sample pixels. After the image processing, the edge of the image is detected. Under normal circumstances, the edge points of the image refer to those pixels in the image which the surrounding pixels have a step change in the gray scale. The edge detection can greatly reduce the amount of data and remove irrelevant information while retain the pixel in the image which can represent the image attribute structure. There are many methods for edge detection, which is not limited here.

The other parts of the image processing device are utilized to process the sample pixel and obtain the parameters, which has the working principle and the specific embodiments have been described in detail in the first two embodiments and FIGS. 11-12, and are not repeated here.

The area dividing module 504 is configured to divide a horizontal axis and a vertical axis of a straight line parameter space equally at a predetermined first pitch and a predetermined second pitch, so as to divide the straight line parameter space into a plurality of parameter areas.

The voting module 505 is configured to vote for the plurality of parameter areas of the straight line parameter space utilizing a coordinate of each sample pixel to obtain a vote amount of each of the parameter area.

The extraction module 506 is configured to extract a straight line parameter and the vote amount of each of the parameter areas having the vote amount larger than a voting threshold, and group the straight line parameters having a distance within a range of a predetermined distance threshold in the straight line parameter space into a group.

The processing module 507 is configured to weight and average the straight line parameter and the vote amount of each group respectively to obtain the straight line parameter of a detected straight line.

The output module 508 is configured to output or store a straight line parameter of the detected straight line.

In other embodiments, the image processing device further includes a conversion module (not shown). The conversion module is configured to convert the coordinate of the sample pixel to the sub-pixel level coordinate, which can improve the accuracy of the coordinate of the original space where the image exists and reduce the error with the points on the actual straight line. Preferably, the coordinate (x,y) of the sample pixel are converted to a pixel center coordinate (x+0.5,y+0.5), which improves the coordinate accuracy of the sample pixel.

The present disclosure also provides a robot. The robot may include: a robot body, a control device mounted inside the robot body, and an image capturing device mounted on the robot body, where the control device may include the above-mentioned image processing device, the image processing device is configured to process an image captured by the image capturing device, and the control device is configured to issue a control instruction to the robot according to a processing result of the image processing device.

For example, the intelligent robot needs to capture the images on the moving path through the image capturing device during the moving process, and then process the image through the image processing device. Since the image may include multiple straight lines, the accuracy of the straight line detection can be improved by adopting the image processing device provided by the present disclosure, and thus improve the accuracy of the recognition of the object in the image, thereby improving the accuracy of the robot control instruction.

The image processing device included in the control device may be the image processing device described in the foregoing embodiment, and the details thereof will be described with reference to the foregoing description, which will not be described again. In addition, the image capturing device may be a camera device, a photographing device, or other device having an image capturing function. For example, a webcam. The image captured by the image capturing device may be transmitted to the image processing device for processing. For details, refer to the description of the foregoing embodiment, which will not be described here The present disclosure further provides a numerical control machine. The machine includes: a machine body, a numerical control device mounted on the machine body, a servo drive device, and an image capturing device. The numerical control device is electrically connected with the servo drive device and the image capturing device. The numerical control device includes an image processing device. The image processing device is configured to process the image captured by the image capturing device. The numerical control device is configured to issue a control instruction to the servo drive device according to a processing result of the image processing device.

In general, the numerical control machine also includes a motor, a processing device (e.g., a tool), and the servo drive device can drive the motor to operate according to the control instruction, thereby driving the processing device to perform the processing operation.

For example, when the numerical control machine needs to locate the working position of the tool, it is possible to control the image obtaining device to capture the image of the working position first, and process the image to identify the working position through the image processing device. In many cases, the working position is represented by multiple lines or curves in the image. Through adopting the image processing device provided by the present disclosure, the accuracy of the straight line detection can be improved, and then improve the accuracy of the working position, and ultimately improve the processing accuracy of the numerical control machine.

The image processing device included in numerical control system may be the image processing device described in the foregoing embodiment, and the details thereof will be described with reference to the foregoing description, which will not be described again. In addition, the image capturing device may be a camera device, a photographing device, or other device having an image capturing function. For example, a webcam. The image captured by the image capturing device may be transmitted to the image processing device for processing. For details, refer to the description of the foregoing embodiment, which will not be described here.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A straight line detection method; comprising:
   obtaining an image to be processed;
   dividing a horizontal axis and a vertical axis of a straight line parameter space equally at a predetermined first pitch and a predetermined second pitch, respectively, so as to divide the straight line parameter space into a plurality of parameter areas; wherein the first pitch and the second pitch are both fractions smaller than 1;
   voting for the plurality of parameter areas of the straight line parameter space by utilizing a sub-pixel level coordinate of each sample pixel to obtain a vote amount of each of the parameter areas, wherein a coordinate of each sample pixel in the image which is a coordinate consisted of integer numbers, is pre-converted into the sub-pixel level coordinate which is a coordinate consisted of numbers each having a decimal part;
   extracting a straight line parameter and the vote amount of each of the parameter areas having the vote amount larger than a voting threshold, and grouping the straight line parameters having a distance within a range of a predetermined distance threshold in the straight line parameter space into a group; and
   weighted averaging the straight line parameter and the vote amount of each group respectively to obtain the straight line parameter of a detected straight line;
   wherein the straight line in the image is represented by a parameter equation $\rho=x \cos \theta+y \sin \theta$, where x denotes a horizontal axis coordinate of the straight line in the image, y denotes a vertical axis coordinate of the straight line in the image, the parameter $\rho$ is a distance from the straight line to the origin in the image, the parameter $\theta$ is an angle between the straight line and the horizontal axis;
   the weighted averaging the straight line parameter of each group and the vote amount respectively to obtain the straight line parameter of the detected straight line comprises:
   calculating a voting weight $P_i$ corresponded by the straight line parameters $\theta_i$ and $\rho_i$ according to the vote amount $m_i$, corresponded by each of the straight line parameter of the first group, and calculating the straight line parameters $\theta$ and $\rho$ of the first group based on the voting weight $P_i$; wherein the first group is any group of the straight line parameters, $m_i$ is the vote amount corresponded by the straight line parameter $\theta_i$, and $\rho_i$ of the first group, i=1, . . . , n (n>1);
   wherein the voting weight $P_i$ is calculated as $$P_i = \frac{m_i - m_{min}}{m_{max} - m_{min}},$$

$m_{min}$ is the minimum vote amount corresponded by the straight line parameter in the first group, $m_{max}$ is the maximum vote amount corresponded by the straight line parameter in the first group.

2. The method of claim 1, wherein the formula for calculating the straight line parameter $\theta$ and $\rho$ of the first group based on the voting weight $P_i$ is:

$$\begin{cases} \theta = \theta_i & i = n = 1 \\ \theta = \dfrac{\sum_{i=1}^{n} \theta_i P_i}{\sum_{i=1}^{n} P_i} & i = 1, \ldots, n \quad n > 1 \end{cases} \begin{cases} \rho = \rho_i & i = n = 1 \\ \rho = \dfrac{\sum_{i=1}^{n} \rho_i P_i}{\sum_{i=1}^{n} P_i} & i = 1, \ldots, n \quad n > 1 \end{cases};$$

$\theta_i$ is an angle between the i-th straight line and the horizontal axis in the first group, and
$\rho_i$ is a distance from the origin to the i-th straight line in the first group.

3. The method of claim 1, wherein the voting for the plurality of parameter areas of the straight line parameter space utilizing the sub-pixel level coordinate of each sample pixel to obtain a vote amount of each of the parameter areas:
   determining a pixel $(x_i, y_i)$; and
   voting from the minimum value to the maximum value of the parameter
   $\theta$ successively within the range of the parameter $\theta$ for the parameter $\rho$ in the straight line parameter space according to a formula $\rho = x_i \cos \theta_j + y_i \sin \theta_j$, wherein the parameter $\theta_j$ is any value within the range of the parameter $\theta$.

4. An image processing method, comprising:
obtaining an image to be processed;
performing an edge detection on the image to obtain a plurality of sample pixels;
dividing a horizontal axis and a vertical axis of a straight line parameter space equally at a predetermined first pitch and a predetermined second pitch, respectively, so as to divide the straight line parameter space into a plurality of parameter areas, wherein the first pitch and the second pitch are both fractions smaller than 1;
voting for the plurality of parameter areas of the straight line parameter space utilizing a sub-pixel coordinate of each sample pixel to obtain a vote amount of each of the parameter areas, wherein a coordinate of each sample pixel in the image which is a coordinate consisted of integer numbers, is pre-converted into the sub-pixel level coordinate which is a coordinate consisted of numbers each having a decimal part;
extracting a straight line parameter and the vote amount of each of the parameter areas having the vote amount larger than a voting threshold, and grouping the straight line parameters having a distance within a range of a predetermined distance threshold in the straight line parameter space into a group;
weighted averaging the straight line parameter of each group and the vote amount respectively to obtain the straight line parameter of a detected straight line; and
outputting or storing a straight line parameter of the detected straight line;
wherein the straight line in the image is represented by a parameter equation $\rho = x \cos \theta + y \sin \theta$, where x denotes a horizontal axis coordinate of the straight line in the image, y denotes a vertical axis coordinate of the straight line in the image, the parameter $\rho$ is a distance from the straight line to the origin in the image, the parameter $\theta$ is an angle between the straight line and the horizontal axis;
the weighted averaging the straight line parameter of each group and the vote amount respectively to obtain the straight line parameter of the detected straight line comprises:
calculating a voting weight $P_i$ corresponded by the straight line parameters $\theta_i$ and $\rho_i$ according to the vote amount $m_i$ corresponded by each of the straight line parameter of the first group, and calculating the straight line parameters $\theta$ and $\rho$ of the first group based on the voting weight $P_i$; wherein the first group is any group of the straight line parameters, $m_i$ is the vote amount corresponded by the straight line parameter $\theta_i$ and $\rho_i$ of the first group, i=1, . . . n (n>1);
wherein the voting weight $P_i$ is calculated as $$P_i = \frac{m_i - m_{min}}{m_{max} - m_{min}},$$

$m_{min}$ is the minimum vote amount corresponded by the straight line parameter in the first group, $m_{max}$ is the maximum vote amount corresponded by the straight line parameter in the first group.

5. The method of claim 4, wherein before the performing the edge detection on the image to obtain the plurality of sample pixels further comprises:
performing a preprocessing on the obtained image.

6. The method of claim 5, wherein the preprocessing comprises at least one of a smoothing, an expanding, a looking for a maximum communicating area, and a corroding performed on the image.

7. A straight line detection device comprising a memory storing a plurality of programs and a processor, wherein the programs when executed by the processor, cause the processor to perform operations, comprising:
obtaining an image to be processed;
dividing a horizontal axis and a vertical axis of a straight line parameter space equally at a predetermined first pitch and a predetermined second pitch, so as to divide the straight line parameter space into a plurality of parameter areas, wherein the first pitch and the second pitch are both fractions smaller than 1;
voting for the plurality of parameter areas of the straight line parameter space utilizing a sub-pixel level coordinate of each sample pixel to obtain a vote amount of each of the parameter areas, wherein a coordinate of each sample pixel in the image which is a coordinate consisted of integer numbers, is pre-converted into the sub-pixel level coordinate which is a coordinate consisted of numbers each having a decimal part;
extracting a straight line parameter and the vote amount of each of the parameter areas having the vote amount larger than a voting threshold, and group the straight line parameters having a distance within a range of a predetermined distance threshold in the straight line parameter space into a group; and weighting and averaging the straight line parameter of each group and the vote amount respectively to obtain the straight line parameter of a detected straight line;
wherein the straight line in the image is represented by a parameter equation $\rho = x \cos \theta + y \sin \theta$, where x denotes a horizontal axis coordinate of the straight line in the image, y denotes a vertical axis coordinate of the straight line in the image, the parameter $\rho$ is a distance from the straight line to the origin in the image, the parameter $\theta$ is an angle between the straight line and the horizontal axis;
the weighted averaging the straight line parameter of each group and the vote amount respectively to obtain the straight line parameter of the detected straight line comprises:
calculating a voting weight $P_i$ corresponded by the straight line parameters $\theta_i$ and $\rho_i$ according to the vote amount $m_i$, corresponded by each of the straight line parameter of the first group, and calculating the straight line parameters $\theta$ and $\rho$ of the first group based on the voting weight $P_i$; wherein the first group is any group of the straight line parameters, $m_i$ is the vote amount corresponded by the straight line parameter $\theta_i$, and $\rho_i$ of the first group, i=1, . . . , n (n>1);
wherein the voting weight $P_i$ is calculated as $$P_i = \frac{m_i - m_{min}}{m_{max} - m_{min}},$$

$m_{min}$ is the minimum vote amount corresponded by the straight line parameter in the first group, $m_{max}$ is the maximum vote amount corresponded by the straight line parameter in the first group.

* * * * *

UNITED STATES PATENT AND TRADEMARK OFFICE
CERTIFICATE OF CORRECTION

PATENT NO.         : 10,430,951 B2  
APPLICATION NO.    : 15/552468  
DATED              : October 1, 2019  
INVENTOR(S)        : Li Wang

Page 1 of 1

It is certified that error appears in the above-identified patent and that said Letters Patent is hereby corrected as shown below:

On the Title Page

Item (73) Assignee should read: SHENZHEN A&E INTELLIGENT TECHNOLOGY INSTITUTE CO., LTD.

Signed and Sealed this  
Thirtieth Day of June, 2020

Andrei Iancu  
*Director of the United States Patent and Trademark Office*